(12) United States Patent
Kasapidis

(10) Patent No.: US 6,882,852 B2
(45) Date of Patent: Apr. 19, 2005

(54) CELLULAR TELECOMMUNICATIONS NETWORK

(75) Inventor: Makis Kasapidis, Yokohama (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/873,796

(22) Filed: Jun. 4, 2001

(65) Prior Publication Data

US 2002/0019239 A1 Feb. 14, 2002

Related U.S. Application Data

(63) Continuation of application No. PCT/GB00/03804, filed on Oct. 4, 2000.

(30) Foreign Application Priority Data

Oct. 6, 1999 (EP) .......................................... 99307888

(51) Int. Cl.⁷ .............................................. H04Q 7/20
(52) U.S. Cl. ............................... 455/456.1; 455/456.2; 370/335
(58) Field of Search ............................. 455/464, 456.1, 455/456.2, 457, 573, 572, 67.11, 67.14; 370/335, 328; 342/389, 450, 457, 463, 464

(56) References Cited

U.S. PATENT DOCUMENTS

| | | | | |
|---|---|---|---|---|
| 5,295,180 A | * | 3/1994 | Vendetti et al. | 455/456 |
| 5,584,055 A | | 12/1996 | Murui et al. | 455/89 |
| 5,600,706 A | | 2/1997 | Dunn et al. | 379/59 |
| 5,701,328 A | * | 12/1997 | Schuchman et al. | 375/139 |
| 5,765,112 A | * | 6/1998 | Fitzgerald et al. | 455/509 |
| 6,201,803 B1 | * | 3/2001 | Munday et al. | 370/350 |
| 6,667,963 B1 | * | 12/2003 | Rantalainen et al. | 370/337 |

FOREIGN PATENT DOCUMENTS

| | | | | |
|---|---|---|---|---|
| EP | 0 568 824 A2 | 11/1993 | | H04Q/7/04 |
| WO | 96/26591 | 8/1996 | | H04L/27/30 |

* cited by examiner

*Primary Examiner*—Erika A. Gary
(74) *Attorney, Agent, or Firm*—McDermott Will & Emery LLP

(57) ABSTRACT

Cellular telecommunication network includes a plurality of base stations, together with a plurality of positioning elements. In order to determine the position of mobile station, positioning signals are transmitted from positioning element and can be detected by mobile station. By detecting the time of arrival of the positioning signals, the network can determine the position of mobile station.

10 Claims, 7 Drawing Sheets

CELLULAR TELECOMMUNICATIONS NETWORK

CROSS-REFERENCE TO RELATED APPLICATIONS

This application is a continuation under 35 U.S.C. 111(a) of PCT/GB00/03804, filed Oct. 4, 2000 and published as WO 01/26404 A1 on Apr. 12, 2001, which claims priority from EP Application No. 19990307888, filed Oct. 6, 1999, both of which applications are incorporated herein by reference.

BACKGROUND OF THE INVENTION

The present invention relates to a Cellular telecommunications network and in particular to a method of positioning a Mobile Station (MS) communicating with such a network. The present invention is especially applicable to a Cellular telecommunications network operating in accordance with a Code Division Multiple Access (CDMA) protocol. In some such systems all Base Transceiver Stations (BTS's) transmit to all MS's within the same portion of the radio frequency spectrum which is referred to as the downlink, whilst all MS's transmit in a different portion of the radio frequency spectrum which is referred to as the uplink.

There is a requirement within such systems, to enable MS's operating within the network to be positioned (i.e. for the position of such MS's to be determined) by the network. A recent proposal to achieve this aim involves a Mobile Station attempting to detect signals transmitted by at least two geographically separated Base Stations in addition to the main Base Station with which it is communicating. The MS can then report the time of arrival of the signals received from the at least two other Base Stations to the network via its serving Base Station g. Provided the network has knowledge of the time at which the signals left the respective other Base Stations, it is able to calculate the time taken for the signals to travel from the other Base Stations to the Mobile Station and from that calculate the distance of the MS to each of these base stations. A round trip delay measurement enables calculation of the MS's distance to the serving BTS. Information about the MS's distance to at least 3 BTSs for which the exact position is known allows the network to perform triangulation and evaluate the MS's position.

However, there is a problem with implementing this method in a CDMA system since all Base Stations transmit within a common frequency range (the downlink, also sometimes referred to as the forward link). In order for signals on a particular channel to be detected they have to be received at power that has a certain ratio to the overall power of all other signals transmitted in the same spectrum portion. Channels transmitted from each BTS are transmitted with adequate power for reception only within the cell's area in order to avoid excess interference to other cells. The power at which any individual channel from any BTS are received in other cells is low and it usually does not satisfy a power ratio requirement that would satisfy the requirements for a time of arrival measurement. This is especially true for MSs that are near their serving BTS where the power from this BTS—which is seen as interference for measurements on signals from other BTSs—is very high. In order to solve this problem, it has been proposed that when a Mobile Station is to be positioned, the main Base Station with which that mobile is communicating will cease all transmissions in the downlink for short periods at predetermined times to enable the Mobile Station to detect the transmissions from other Base Stations during these times.

There are several drawbacks with this scheme, including the following three principal drawbacks. Firstly, during each quiet period (often referred to as an idle slot) the main Base Station is unable to transmit any information to any of the Mobile Stations with which it is in communication. Secondly, since the Base Stations are not normally synchronous with one another, some mechanism must be provided for enabling all of the Base Stations to know about the relative timing of all neighbouring Base Stations. This adds additional complexity to the network. Thirdly, the Mobile Station requires a fairly high specification Automatic Gain Control unit (AGC) as part of its receiving circuitry, to be able to quickly switch from detecting the transmissions from its main Base Station to detecting the much lower power transmissions from other more distant Base Stations.

An alternative known method of positioning of mobile stations within a CDMA cellular telecommunications network involves the use of beacons which are strategically located throughout the network. The beacons simply transmit signals at known power level which are able to be detected by the mobile stations within the network which are sufficiently close to them. Included within the signals transmitted by the beacons is information identifying the beacons. A mobile station which desires to be positioned detects the signals and measures the strength of the received signals. From the strength of the received signals and the known transmitted power the path loss is evaluated and from that the distance that would correspond to such a loss in that particular environment. Information on the distance of the MS to at least 3 geographical locations (beacon locations) allows calculation of the MS's position. The drawbacks associated with this method are that measuring received signal strength is not very reliable, the path loss is environment dependent and the dependency may not be very accurate, and the beacons transmit on the downlink inducing some capacity loss.

SUMMARY OF THE INVENTION

According to the present invention, there is provided a method of positioning a Mobile Station within a Cellular telecommunications network which includes a plurality of Base Stations and a plurality of positioning elements and in which Mobile Stations and Base Stations communicate with one another over an air interface, said method including:

- at least one positioning element transmitting a predetermined positioning signal at a predetermined time, which preferably can be determined by the MS based on its timing relationship with a serving BTS;
- said Mobile Station determining a window of time within which to attempt to detect said positioning signal;
- said Mobile Station detecting said positioning signal; and
- determining a time-of-arrival value dependent on the time of arrival at said Mobile Station of said positioning signal.

This method of positioning a Mobile Station (i.e. determining the position of the Mobile Station) has a number of advantages over methods which are based solely on the Mobile Station detecting transmissions from Base Stations which are geographically separated from the main Base Station with which the Mobile Station is communicating (i.e. the serving base station). For example, it is not necessary for the main Base Station with which the Mobile Station is communicating to cease all transmissions for short periods of time (i.e: for idle slots) in order for positioning to take place. Furthermore, the use of dedicated positioning elements enables such positioning elements to be geographically located so as to optimise the function of positioning Mobile Stations. By contrast, the position of Base Stations is primarily dictated by the need for each Base Station to transmit successfully to any Mobile Station located within the area for which that Base Station will have primary responsibility (such an area typically being referred to as a cell). The prior art method discussed above essentially involves a Mobile Station detecting transmissions from Base Stations in different cells to the cell in which the Mobile Station is located. By contrast, with the present invention, a positioning element can be located within the same cell as the Mobile Station, and it can be located specifically to cater for the geographical features in that cell which might make it difficult for the Mobile Station to receive transmissions from neighbouring Base Stations in certain parts of that cell (for example, in front of a large building having a neighbouring Base Station located behind the building).

Preferably, the air interface operates in accordance with a Code Division Multiple Access protocol or environment. This renders the present invention particularly useful since it overcomes a number of problems which are particular to CDMA systems. For example, a known method of positioning a mobile within a GSM system involves using listening posts which listen to transmissions from the mobile station; by determining the time of arrival of these transmissions at the listening posts together with a knowledge of the relative timing of base station transmissions, it is possible for the relative distance between the listening posts and the mobile station to be deduced and from this (given that the positions of the listening posts are known) it is possible to deduce the position of the mobile station. However, such a system will not work within a CDMA system in which all mobile stations transmit on the uplink because the listening posts will not be able to reliably recover any individual mobile signal from other mobile stations located near to the listening posts which are also transmitting in the uplink. Nonetheless, the present invention is applicable to non-CDMA systems although it is especially advantageous when applied to CDMA systems.

Preferably, said positioning signal is transmitted at a predetermined time relative to the timing of transmissions from a Base Station with which the Mobile Station is in communication, and said time-of-arrival value is also preferably relative to the timing of transmissions from said Base Station, whereby intelligence in the network to which the BTS belongs can determine the time taken for the positioning signal to travel from the positioning element to the Mobile Station by means of simple algebra together with knowledge of the time taken for signals to travel between the Base Station and the positioning element and between the Base Station and the Mobile Station. For example, each Base Station might transmit in one channel known signals whose primary function is to enable Mobile Stations to synchronise with the transmissions from the Base Station (such a channel might for example be referred to as the pilot channel or a synchronisation channel). Typically, all transmissions from the Base Station will be divided in time into frames, and each frame may be further divided into slots. For example, each frame might have a period of 10 milliseconds. Once the known signal, or channel in which the known signal is being transmitted, has been detected, a Mobile Station will be in synchronisation with the Base Station and will thus know when each new frame transmitted by the Base Station begins. This will enable the Mobile Station to detect other channels. Furthermore, the various frames transmitted by the Base Station may also be grouped into hyper-frames or multi-frames, each of which may comprise a certain fixed number of frames. Successful detection of the synchronization channel will also enable a Mobile Station to determine when a new multi-frame begins.

Preferably, said positioning element transmits only intermittently, such that it is in a state of not transmitting any signals for larger average periods of time than it is in a state of transmitting signals. Most preferably, the duty rate of transmitting versus not transmitting is less than one per cent over periods of greater than one hour. This has the advantage that the signals transmitted via the positioning elements (which will appear only as noise to all Mobile Stations which do not require positioning) only generate a relatively small amount of noise on average. Furthermore, since the positioning elements only need to transmit infrequently, the average power consumed by the positioning elements will be relatively small thus allowing for a relatively large battery lifetime (if one or more batteries are used to power the positioning elements, as is preferred).

Preferably, the positioning element transmits signals not used by Base Stations within the network. For example, in the envisaged Universal Mobile Telecommunications Standard (UMTS) a mathematical process is used to generate two hundred and fifty six 256 chip long spreading codes of which sixteen have been selected for use in the synchronization channel. None of these spreading codes will be used for spreading traffic data by either Base Stations or Mobile Stations. The sixteen codes designated for use by the synchronization channel are transmitted intermittently by the BTS, typically one such code in each slot and a unique combination of the 15 codes found in the 15 slots in each frame. This combination would be repeatedly transmitted in each frame. The MS only attempts to detect the synchronization channel at power-on and during measurements of adjacent Base Station channel strength (e.g. handover preparation). According to a preferred embodiment of the present invention, each positioning element will transmit as its positioning signal one of the said two hundred and fifty six 256 chip long spreading codes which are not designated for use by Base Stations as synchronisation characters according to UMTS. Preferably, each positioning element has only one such code assigned to it and every positioning element within a particular cell has a different such code assigned to it. This would allow the PE signals on which measurements are made by the MSs to be uniquely associated with the transmitting PE.

Preferably, said positioning element is in at least one-way communication with said Base Station via the air interface, and said method preferably further includes said Base Station instructing said positioning element to transmit said positioning signal at the next predetermined time relative to the time of detection by said positioning element of a signal or part of a signal transmitted by said Base Station.

According to an alternative embodiment of this invention, the positioning elements transmit their signals periodically at predetermined times relative to the time of detection by said positioning elements of a signal or part of a signal transmitted by said Base Station and without instruction by the BTS.

According to a second aspect of the present invention, there is provided a positioning element for use in positioning a Mobile Station communicating with a Base Station forming part of a Cellular telecommunications network, said positioning element comprising:

positioning-element-to-Mobile-Station transmitting means for transmitting positioning signals capable of being received by said Mobile Station; and timing means for enabling the positioning element to transmit said positioning signals at predictable times with respect to the transmissions of said Base Station with which the mobile unit to be positioned is communicating.

Preferably, the cellular telecommunications network operates in a Code Division Multiple Access environment.

Preferably, the positioning element includes Base-Station-to-positioning-element receiving means for receiving signals transmitted by said Base Station. This enables each positioning element to receive instructions from the Base Station and to determine when to time the transmission of its positioning signals relative to the timing of the Base Station using the air interface. In this way, all aspects of the positioning element's operation can be configured without the need for a wired link to the associated network.

Preferably, the positioning-element-to-Mobile-Station transmitting means is adapted to transmit positioning signals only intermittently and most preferably only in response to detecting an instructing signal from the Base Station. This has a number of advantages discussed above to do with power consumption and not generating too much noise for other Mobile Stations in the vicinity of the positioning element, and also permits the positioning element to successfully receive and detect the transmissions from the Base Station (note that generally speaking the positioning element may not transmit its own positioning signals in the downlink at the same time as receiving signals from the Base Station in the downlink).

Preferably, the positioning element further comprises switch means for connecting a shared aerial either to the positioning-element-to-Mobile-Station transmitting means or to said Base-Station-to-positioning-element receiving means. Note, that since the positioning element needs to transmit its positioning signals only intermittently, it is not necessary for the positioning element to include duplex means which, in any event, would not generally be able to permit input and output signals to be kept separate from one another when both signals were contained within the downlink.

Preferably, the positioning element is adapted to transmit a positioning signal in response to an instruction signal transmitted by said Base Station.

According to a third aspect of the present invention, there is provided a Cellular telecommunications network for communicating with one or more Mobile Stations across an air interface, said network comprising at least one positioning element as described above in combination with a plurality of Base Stations each of which is capable of communicating with one or more Mobile Stations. Preferably the network also includes a module for calculating the position of the Mobile Station.

Preferably, the network operates in a Code Division Multiple Access environment.

According to a fourth aspect of the present invention, there is provided a Cellular telecommunications network as described above in combination with a Mobile Station adapted to communicate with the network via the air interface and adapted to detect a positioning signal transmitted by a positioning element forming part of the network.

According to a fifth aspect of the present invention, the present invention comprises the use of a Mobile Station adapted to communicate with the Cellular telecommunications network described above to enable the Mobile Station to be positioned by detecting a positioning signal transmitted by a positioning element.

According to a sixth aspect of the present invention, there is provided a Mobile Station for communicating with a Cellular telecommunications network as above described via the air interface, said Mobile Station including Base-Station-to-Mobile-Station receiving means for receiving signals from a Base Station and positioning-element-signal detecting means for detecting a positioning signal transmitted by a positioning element, wherein said positioning-element-signal detecting means preferably includes window-of-reception determination means for determining a window-of-reception within which a positioning signal is expected to be received, and preferably further includes detection means for detecting the positioning signals in the presence of signals transmitted by said Base Station which may continue to be detected by said Base-Station-to-Mobile Station receiving means.

Preferably, the output of the detection means can be associated with a time instance relative to the to the time of detection by said Mobile station of a signal or part of a signal transmitted by the serving Base Station.

Preferably, said detection means comprises a matched filter adapted for detecting a positioning element signal in the form of a spreading code which is not used by any of the Base Stations within the network for communicating with the Mobile Station.

Preferably, the positioning element comprises discrimination means for discriminating between signals transmitted by a base station and signals transmitted by a positioning element.

According to a seventh aspect of the present invention, there is provided a Base Station for use in a Cellular telecommunications network as described above, said Base Station including Base-Station-to-positioning-element transmitting means for transmitting signals to at least one positioning element.

In a preferred embodiment, the Base Station further includes at least one of the following functional modules:

- a module for responding to a request to position a Mobile Station by alerting one or more positioning elements and informing the Mobile Station to prepare itself for attempting to detect one or more positioning signals;
- a module for receiving a time-of-arrival signal from the Mobile Station and determining if there is enough information in the signal for the position of the Mobile Station to be established (note this will generally involve the use of additional already known information);
- a module for sending on the time of arrival signal to a processing unit in communication with the Base Station; and
- a module for reconfiguring one or more positioning elements via the air interface when the time-of-arrival signal does not contain sufficient information for the position of the Mobile Station to be established.

BRIEF DESCRIPTION OF THE DRAWINGS

In order that the present invention may be better understood, embodiments thereof will now be described by way of example only with reference to the accompanying drawings in which.

DETAILED DESCRIPTION

Figure 1:
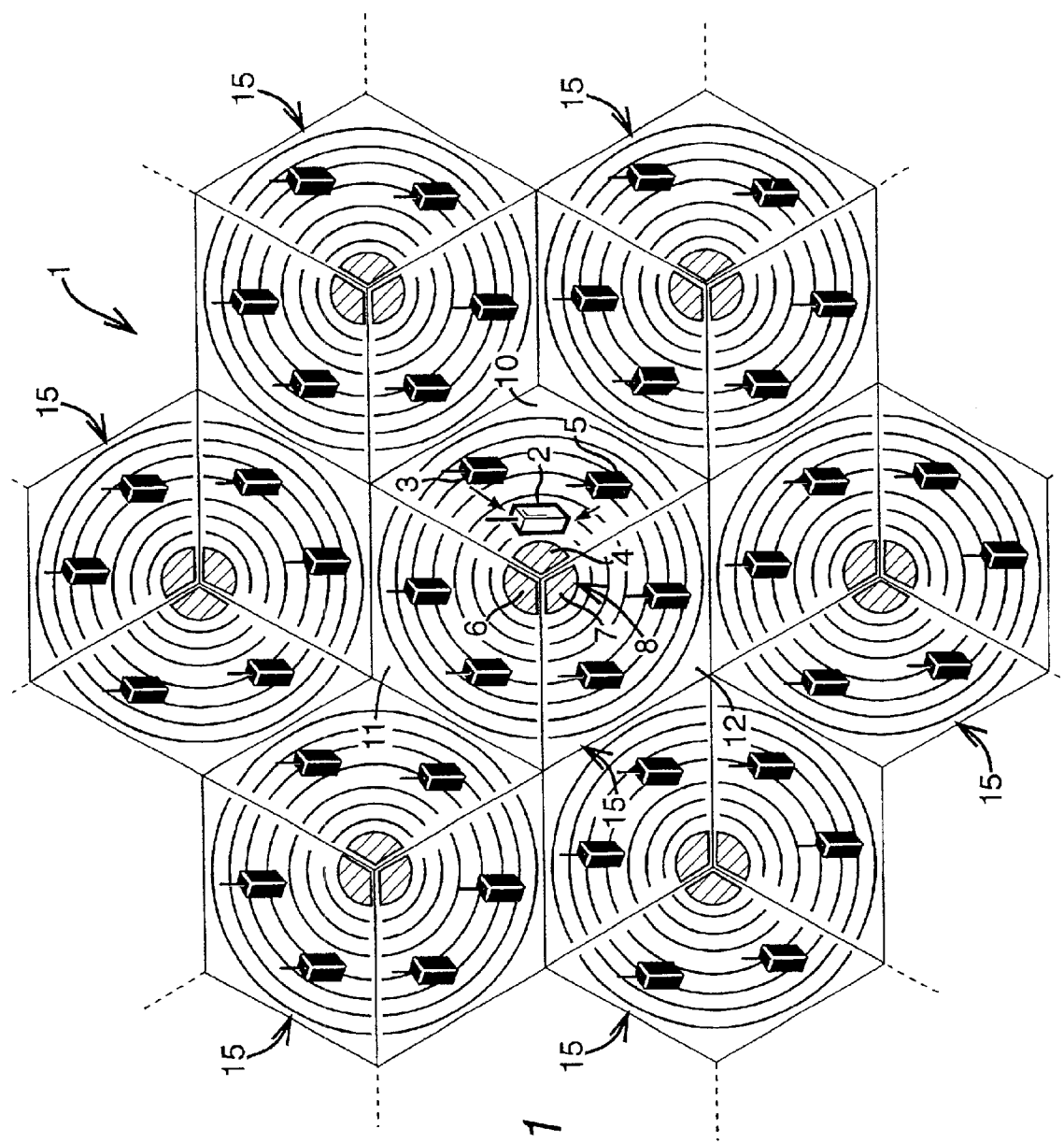
FIG. 1 is a schematic plan view of a Cellular telecommunications network in accordance with the present invention.

Cellular telecommunications network 1 comprises a plurality of Base Stations 4, 6, 7 together with a plurality of positioning elements 3, 5. In order to position a Mobile Station 2, positioning signals are transmitted from the positioning elements 3, 5 and can be detected by Mobile Station 2. Mobile Station 2 is able to associate detection of signals from PEs 3, 5 with the identity of the positioning elements 3, 5 which transmitted each respective positioning signal and with detection time relative to the time of detection by Mobile Station 2 of a signal or part of a signal transmitted by said Base Station 4. This information is then transmitted to the main Base Station 4 with which the Mobile Station 2 is in communication. The positioning elements 3, 5 are in synchronization with the main Base Station 4 (i.e. they are synchronized to the downlink transmissions of the serving Base station) and thus the time of transmission of the positioning signals is known. By calculating the time taken for the transmission signals to travel between the positioning elements 3 and Mobile Station 2 it is possible to calculate the distance of the Mobile Station 2 from each of the positioning elements 3. Using a return trip delay measurement the distance between the Base Station 4 and the Mobile Station 2 can be calculated. Once the distance of the Mobile Station 2 from at least 3 geographically separated positions is known, the position of the Mobile Station 2 can be calculated by triangulation.

In Cellular telecommunications network 1, the geographical region covered by the network is divided up into a plurality of cells 10, 11, 12. Cells 5 are grouped together in groups of three cells to form approximately hexagonal regions 15 with three Base Stations 4, 6, 7 being located in group 8 at the centre of the hexagon each Base Station 4, 6, 7 being located at a corner of its respective cell 10, 11, 12 such that the borders of the three cells 10, 11, 12 extend away from the group 8 of three Base Stations 4, 6, 7 with approximately 120 degree separations from one another.

The present invention is applicable in particular to a Cellular telecommunications network 1 operating in accordance with a Code Division Multiple Access (CDMA) protocol for permitting a plurality of channels of data traffic to be transmitted between Base Stations 4, 6, 7 and Mobile Stations 2 across the air interface. In particular, the present invention is applicable to so called Wide-band CDMA (WCDMA)protocols such as that which is to form part of the Universal Mobile Telecommunications Standard (UMTS). The principals of WCDMA are well-known in the art and will not be described here in detail. However, to ensure that the intended meaning of terms of art used throughout this specification are clear, a brief overview of the principles of CDMA which is set out in the 3GPP technical specifications 25 series(25.2xx) is incorporated herein by way of reference. In order to distinguish one channel from another in CDMA systems, each data signal to be transmitted over a channel is spreaded by a spreading code which is particular to that channel.

The set of spreading codes which can be used is finite. Although there will generally be sufficiently many spreading codes available for use by a single Base Station there may need to be a re-use of spreading codes by adjacent Base Stations. Since there is no fixed timing relationship between Base Stations, it may be-that transmissions from two near Base Stations, both using the same spreading code, could be received by a mobile and could interfere with one another preventing the mobile from recovering either signal. To prevent this, all signals transmitted to or from a particular Base Station are scrambled with a scrambling code which is either unique to each Base Station or is re-used by the network sufficiently infrequently that any two Base Stations using the same scrambling code will be sufficiently distant from one another that no significant interference will occur.

To further assist the Mobile Stations, according to UMTS, each Base-Station will additionally transmit unscrambled synchronization characters (probably one synchronization character every slot in every frame).

Figure 2:
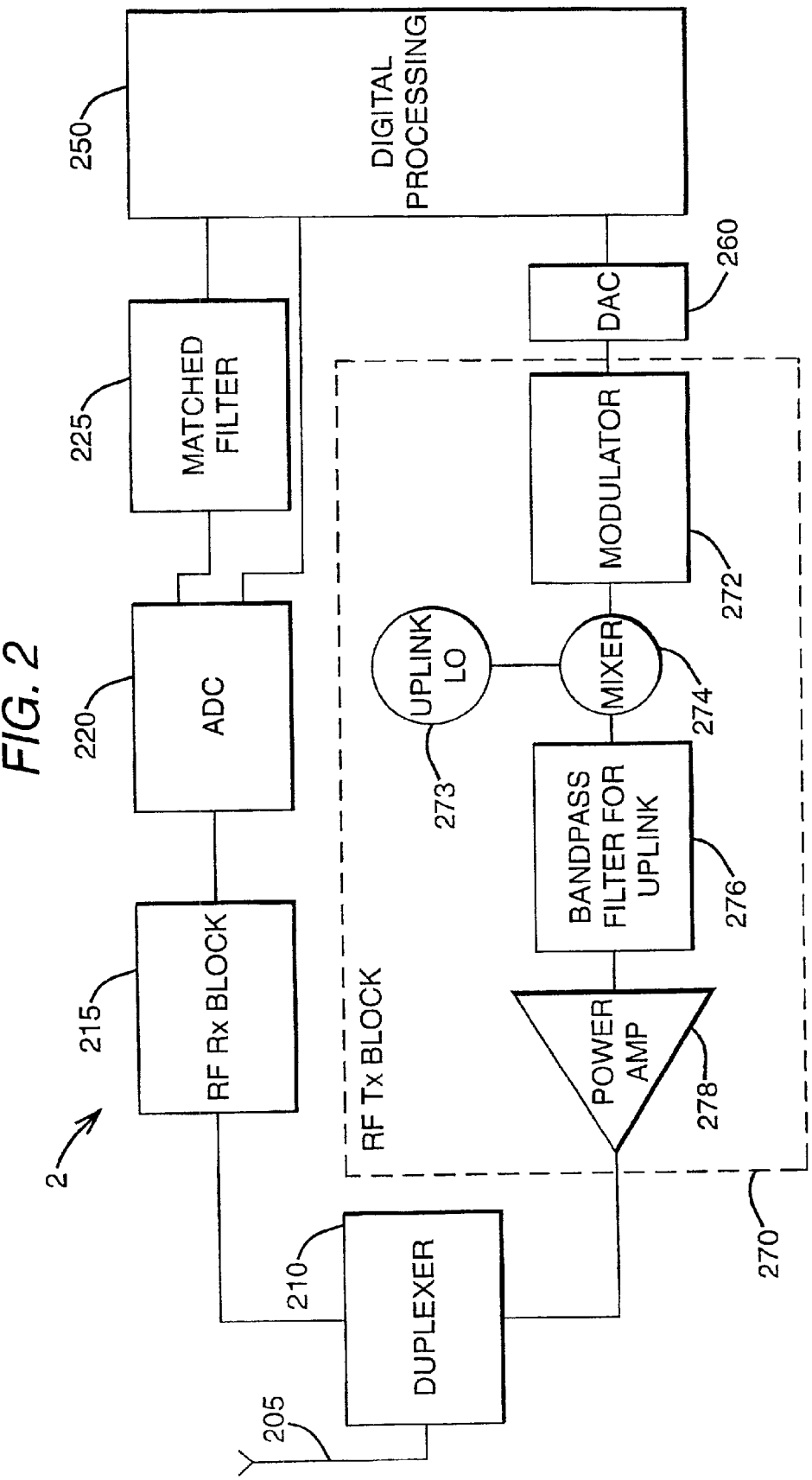
FIG. 2 is a schematic block diagram of a Mobile Station in accordance with the present invention.

Referring now to FIG. 2, Mobile Station 2 comprises an aerial 205, a duplexer 210, a Radio Frequency (RF) reception block 215, an analogue to digital converter (ADC) 220, a matched filter 225 a digital processor 250 a digital to analogue converter (DAC) 260 and an RF transmitting block 270. The RF transmitting block 270 is illustrated as comprising a modulator 272, an uplink local oscillator (LO) 273, an RF mixer 274, an uplink bandpass filter 276 and an RF power amplifier 278.

The operation of Mobile Station 2 will now be described. An RF signal impinging upon aerial 205 and having a frequency falling within the downlink frequency range will pass through duplexer 210 substantially unimpeded onto RF receiving block 215. Duplexer 210 simply acts to permit downlink signals received on aerial 205 to be transferred to RF receiving block 215 at the same time as permitting uplink signals output from the RF transmitting block 270 to be transmitted or broadcast from aerial 205. RF receiving block 215 in combination with ADC 220 process the incoming downlink signals to down-convert them from radio frequency to base band and to generate digital sample values of the received signals which may be further processed by purely digital components. Generally speaking, the RF receiving block can be thought of as down-converting the analogue RF signals to analogue base band signals, and the ADC 220 as converting the analogue base band signal from analogue to digital. The ADC 220 operates at a sampling rate which is higher than the chip rate of the received signal.

The over-sampled digital signal output from ADC 220 is passed in parallel both to matched filter 225 and digital processing block 250. Matched filter 225 is shown in FIG. 2 as a separate component from digital processing block 250 for illustrative purposes only since it is likely that all digital processing including the process performed by matched filter 225 will be carried out within a single Digital Processor (DSP) having associated memory means and being initially programmed to carry out all of the necessary functions. Matched filter 225 is primarily responsible detecting signals when any one or more of the following parameters is not fully known:—the timing of the received signal (i.e. where the beginning of a slot, character or frame etc begins or ends), the spreading code or the scrambling code. By contrast, digital processing block 250 is primarily used for recovering a data signal when all of those above parameters are known. Thus on start-up of Mobile Station 2, matched filter 225 might first try to detect a synchronization character transmitted by the closest Base Station 4. To do this, it might store just over one slot's worth of samples output by ADC 220 and attempt to correlate the series of sample values thus stored with all of the different spreading codes used for synchronization characters using a sliding window technique in which the window of sample values is slid along by one sample value after all of the spreading codes have been tried on that window's worth of samples corresponding to chips. If only one good correlation is found for a single slots worth of chips, then it can be deduced that the synchronization character associated with the spreading code which achieved the high correlation has been transmitted by the closest Base Station. Furthermore, the matched filter 225 will now know timing information about the Base Station and when it examines the next slot's worth of samples it can home in much more quickly to the correct window to identify the subsequent synchronization characters. Once the entire synchronization word has been decoded in this way, the Mobile Station can establish the identity of -the main Base Station, will have details about its timing information and can even deduce the scrambling code which is used by the Base Station in question. This information can then be used by the digital processing block 250 to decode one of the scrambled channels transmitted by the Base Station such as for example the pilot channel to enable the Mobile Station to obtain more timing information such as for example, information relating to the start of each multi-frame. Thereafter, the digital processing block 250 can monitor the Paging Indication Channel (PICH) to see if it is paged at any time by the Base Station.

Once the Mobile Station 2 is in synchronization with the Base Station 4, it can transmit messages in the uplink to the Base Station 4. To do this, a data signal to be transmitted is spreaded using a spreading code allotted to it by Base Station 4 and possibly also a scrambling code. The signal is then output to DAC 260 which converts the digital signal into a corresponding analogue signal. The output from DAC 260 is then processed by the RF transmitting block 270 which ultimately outputs an uplink signal for broadcast by aerial 205 via duplexer 210. Within the RF transmitting block 270, modulator 272 modulates the analogue signal for example using a modulation scheme such as Binary Phase Shift Keying (BPSK). The modulated signal is then up-converted to the uplink frequency by means of uplink local oscillator 273 and RF mixer 274. Uplink band pass filter 276 filters the signal output by mixer 274 to remove any unwanted harmonics or other noisy components outside the uplink frequency range and transmits the filtered signal to power amplifier 178 which amplifies the signal prior to outputting the signal to duplexer 210.

Figure 3:
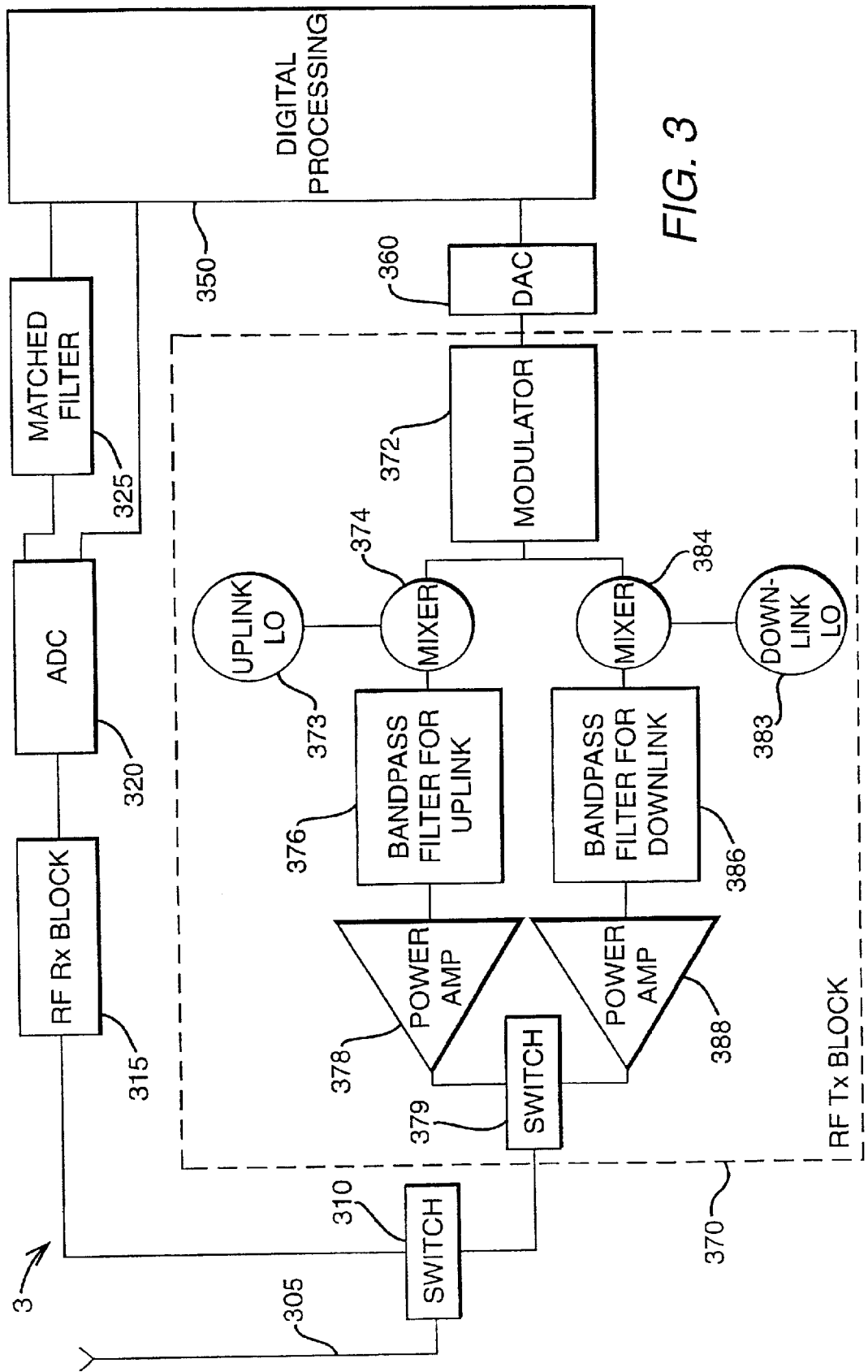
FIG. 3 is a schematic block diagram of a positioning element in accordance with the present invention.

Referring now to FIG. 3, there is shown a positioning element 3 comprising an aerial 305 a first switch 310 an RF receiving block 315 an ADC 320 a matched filter 325, a digital processing block 350, a DAC 360 and RF transmitting block 370. RF transmitting block 370 comprises a modulator 372 an uplink local oscillator 373 and uplink mixer 374, an uplink band pass filter 376, an uplink power amp 378, a second switch 379, a downlink local oscillator 383, a downlink mixer 384, a downlink band pass filter 386 and a downlink power amplifier 388.

The operation of positioning element 3 is similar to that of Mobile Station 2. However, instead of duplexer 210 positioning element is provided with a switch 310 since it does not need to transmit and receive signals at the same time. Instead, when positioning element 3 is transmitting switch 310 will connect aerial 305 to RF transmitting block 370 and when positioning element 3 is not transmitting switch 310 will connect aerial 305 to our RF receiving block 315. Similarly, in addition to having an uplink local oscillator 373, uplink mixer 374, uplink band pass filter 376 and uplink power amplifier 378 for transmitting signals in the uplink as does Mobile Station 2, positioning element 3 additionally includes a downlink local oscillator 383, a downlink mixer 384, a downlink band pass filter 386 and a downlink power amplifier 388 together with a switch 379 for connecting either the output of uplink power amplifier 378 or the output of downlink power amplifier 388 to the first switch 310. The additional downlink transmission components enable positioning element 3 to transmit either in the uplink or in the downlink frequency range.

Finally, it should be noted that positioning element 3 further does not require a number of the additional features which are required by Mobile Station 2 to enable it to be used as a personal communications device. For instance, positioning element 3 does not require a screen, input keys, voice coders or other such features which are required by a Mobile Station 2 which is in the form of a portable personal communications device such as a mobile telephone.

Figure 4:
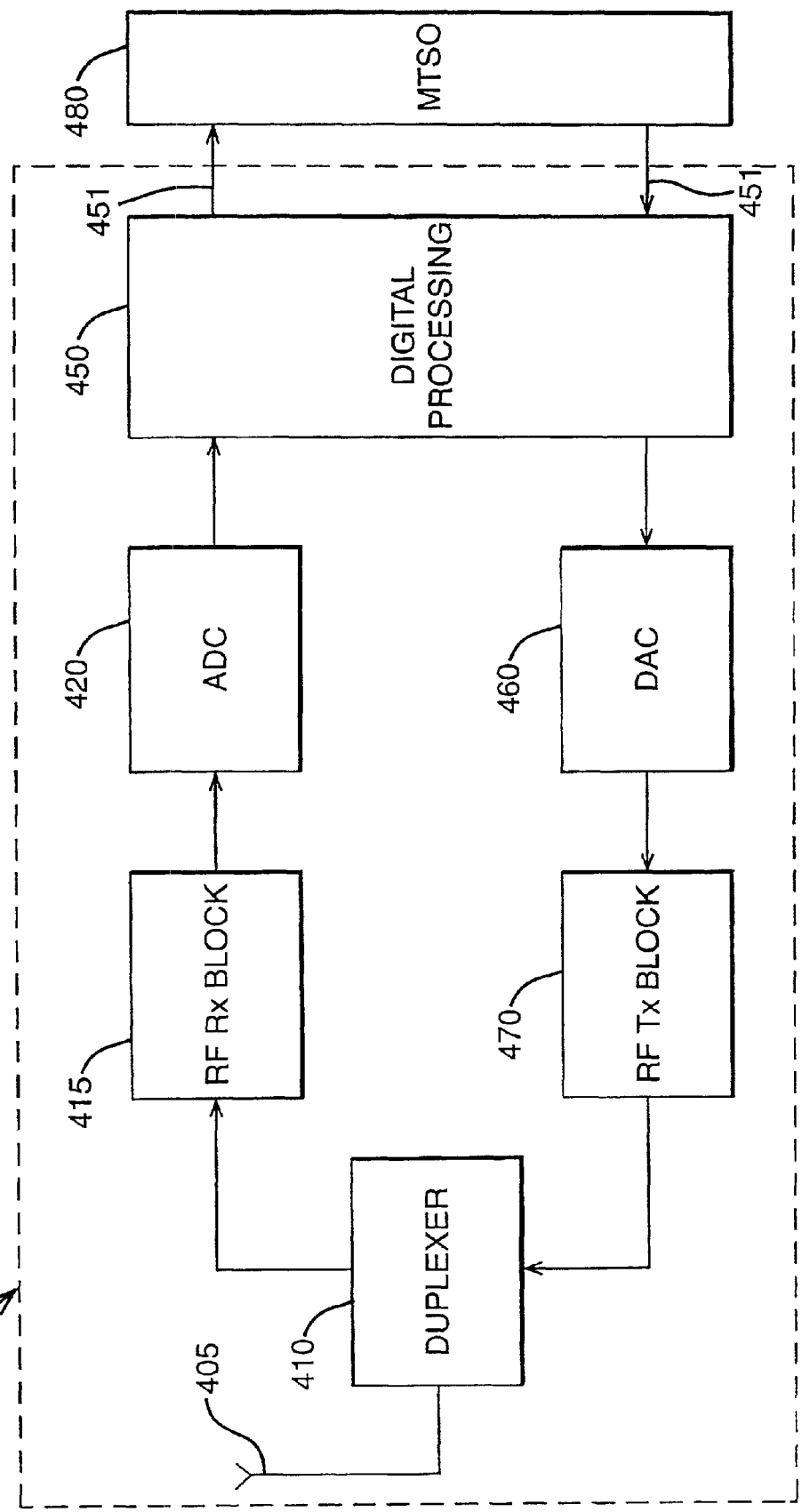
FIG. 4 is a schematic block diagram of a Base Station in accordance with the present invention.

Turning now to FIG. 4, Base Station 4 is shown as comprising an aerial 405, duplexer 410, RF receiving block 415, ADC 420, digital processing block 450, DAC 460, RF transmitting block 470, and connection means 451 for permitting Base Station 4 to be connected to a Mobile Telephone Switching Office (MTSO) 480.

Figure 5:
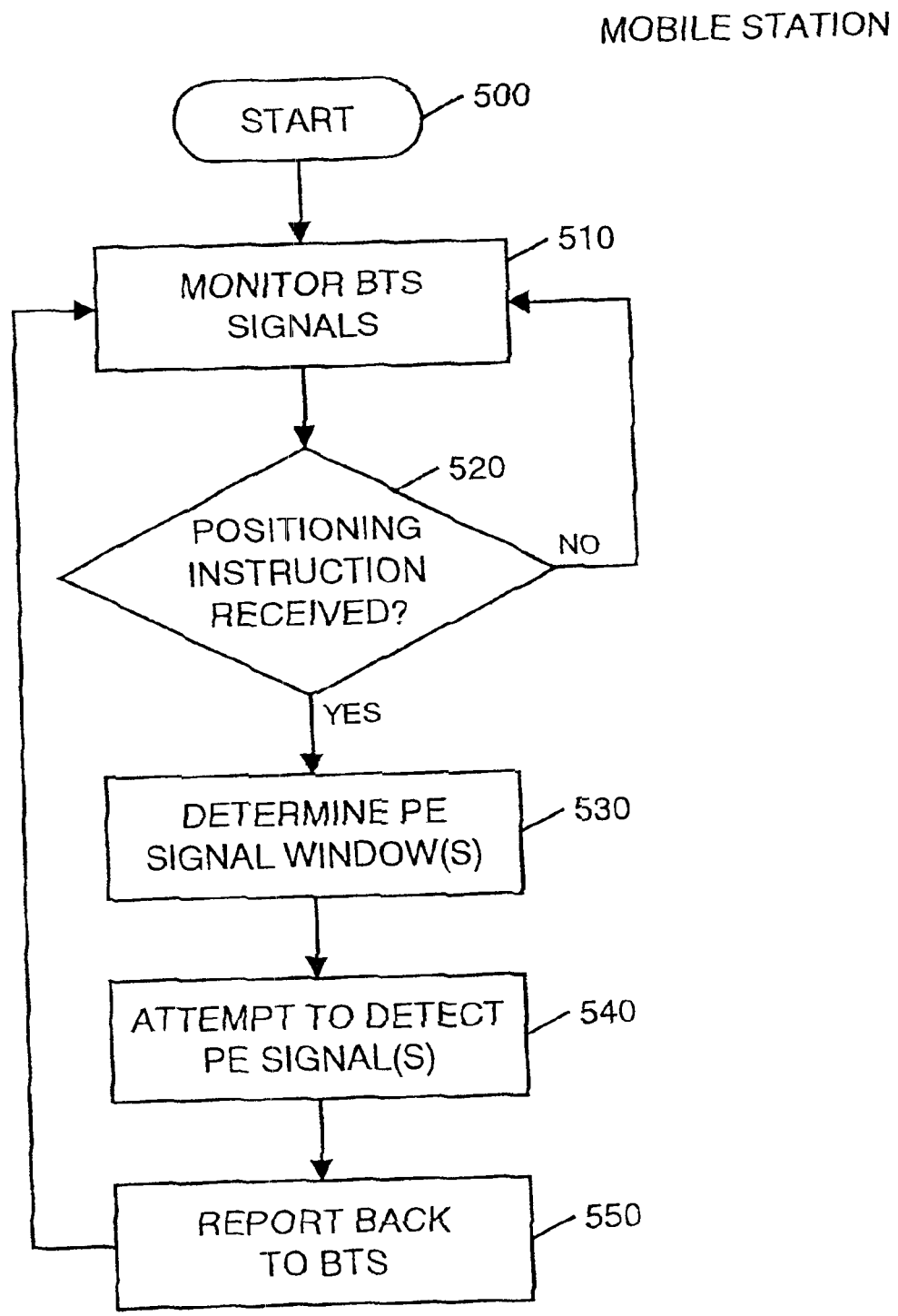
FIG. 5 is a flow chart setting out the steps to be performed by a Mobile Station in order to carry out a method in accordance with the present invention.

The design and operation of a WCDMA Base Station such as Base Station 4 is well-known in the art and will not be described here in great detail. However, the basic operation is essentially similar to that of Mobile Station 2 and positioning element 3 such that signals received by aerial 405 in the uplink are passed via duplexer 410 to RF receiving block 415 and ADC 420 which generates over-sampled digital sample values for processing via digital processing block 450. Within digital processing block 450 (which is considerably-more complicated and more powerful than the corresponding digital processing blocks in either Mobile Station 2 or positioning element 3) the received digital sample values are converted into a number of component channels (one from each Mobile Station communicating with the Base Station 4) and the data signals initially transmitted by the Mobile Stations are recovered. Base Station 4 also includes means 451 for connecting the Base Station 4 via a wired link to a Mobile Telephone Switching Office (MTSO) 480 where connections can be made to the Public Switched Telephone Network (PSTN) or to other Base Stations via wired links and from there to further Mobile Stations via the air interface, etc. Furthermore, Base Station 4 is powered by mains electricity where possible or alternatively by its own electricity generator in more remote areas. Referring now to FIG. 5, the steps to be taken by Mobile Station 2 in order to be positioned by the network comprise the steps of start step 500 for starting the routine, the step of monitoring Base Station signals 510 the decision step of determining if a positioning instruction has been received 520, the step of determining a positioning signal window or windows 530, the step 540 of attempting to detect a positioning signal or signals and a step 550 of reporting back results to the Base Station.

In the step 510 of monitoring the Base Station signals, the Mobile Station will typically rely on a predetermined convention by which a particular high level signal is transmitted by the Base Station which the Mobile Station recognises as a positioning instruction.

The next step 520 for determining whether a positioning instruction has been received causes the instruction flow to return to the preceding step 510 if no position instruction has been received or otherwise the instruction flow is moved onto to step 530 of determining a positioning signal window or windows. In step 530 the Mobile Station 2 identifies an expected window within which it expects to find a positioning signal which, in this embodiment, takes the form of a synchronization character not used by any of the Base Stations 4 within the network 1. The determination of the expected window of reception of the positioning signal is performed in this case by examining the positioning instruction received from Base Station 4 which includes within it details of the expected windows of arrival of the positioning signals. The positioning instruction also includes details of which synchronization characters the Mobile Station should expect to receive in the respective positioning signal windows. The information thus determined by the Mobile Station 2 is then passed onto the matched filter 225 for use in the next step 540 of attempting to detect the positioning signals. In the step of attempting to detect the positioning signals, the matched filter 225 stores all of the digital samples falling within the expected windows of arrival of the positioning signals and attempts to correlate each sliding window portion of the samples with the respective synchronization character spreading code (note that in order to do this, the matched filter 225 needs to be adapted to detect not only synchronization characters as transmitted by base stations but also synchronization characters transmitted by positioning elements which differ in this embodiment from those transmitted by base stations). If a high correlation is found corresponding to the desired synchronization character in the expected window, then the exact start time of this detected synchronization character is determined and passed onto the digital processing block 250 together with the identity of the synchronization character for use in the following step 550 of reporting back to the Base Station. In the final step 550 of reporting back to the Base Station, the results of the step 540 are transmitted back to the Base Station as part of high level signaling information. Note that the entire routine is performed without interrupting the flow of traffic data between Mobile Station 2 and Base Station 4. Further, also note that in step 540 it is possible that each positioning signal might be received by Mobile Station 2 via more than a single path (as a result of the positioning signal being deflected off, for example, a large building or hill, etc) in such a case, the matched filter will report back the time of arrival of the earliest such detected signal since this corresponds the shortest detected path between the PE and the MS If each positioning element transmits in a plurality of predetermined relative time instances, the Mobile Station 2 will report back the earliest relative path from all the detected instances of signals from PE's.

Figure 6:
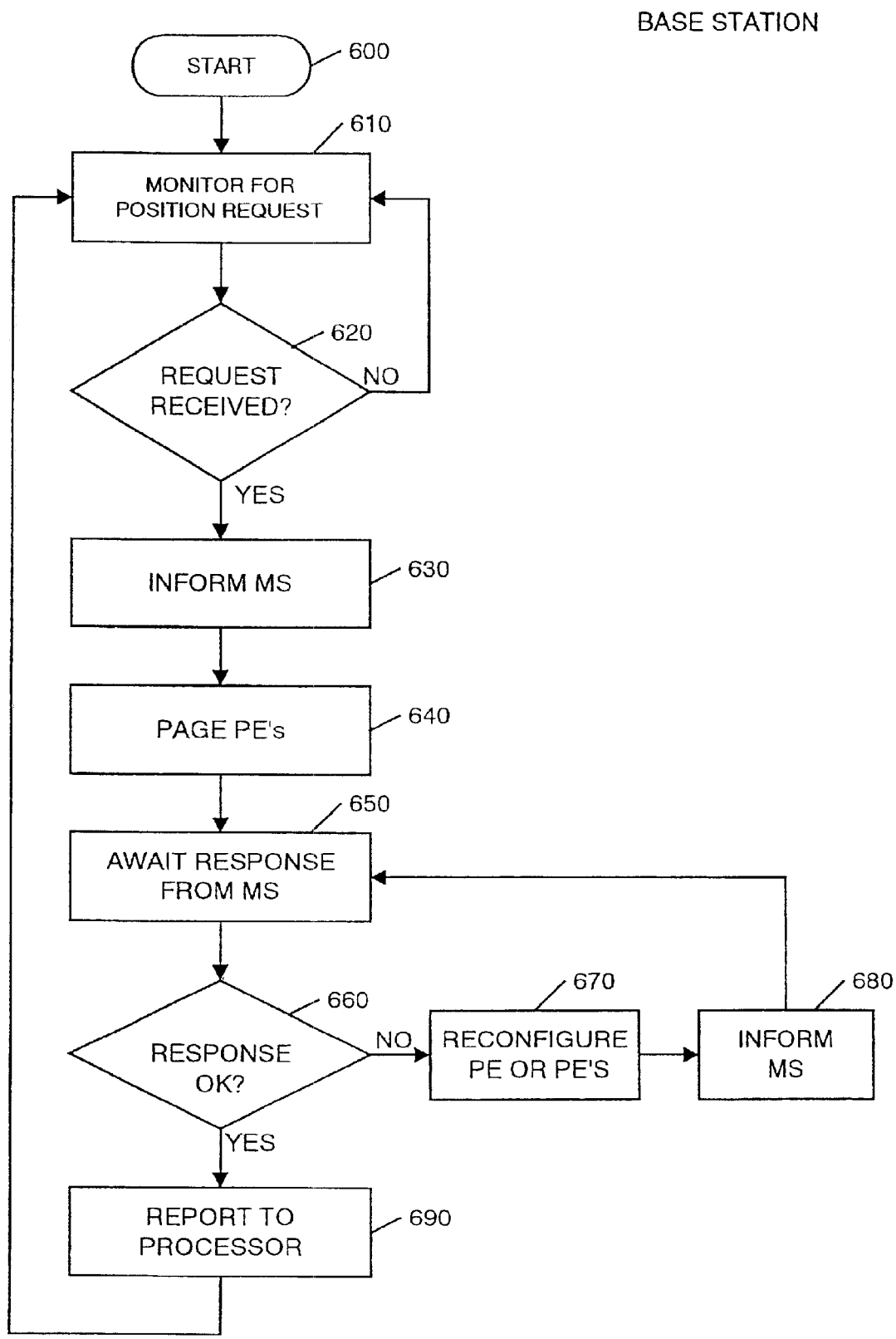
FIG. 6 is a flow chart setting out of the steps to be performed by a Base Station in order to carry out a method in accordance with the present invention.

Turning now to FIG. 6, the Base Station 4 performs the following steps in order to position the Mobile Station 2: a start step 600, a monitor for position request step 610, a determine if position request has been received step 620, an inform Mobile Station step 630, a page positioning elements step 640, an await response from Mobile Stations step 650, a determine if response from Mobile Station is okay step 660, a reconfigure positioning elements step 670, a second step of informing a Mobile Station 680 and a report to processor step 690. The monitor for a position request step 610 requires the Base Station to monitor a number of possible sources of such a request for positioning a Mobile Station 2. In particular, the Base Station needs to monitor for position requests received either from a Mobile Station 2 or from the network 1, via MTSO 480. Determination step 620 either causes the instruction flow to return to preceding step 610 if no such request has been received or alternatively causes the instruction flow to proceed to succeeding step 630 in the event that a position request has been received. In steps 630 and 640 which may be performed in either order or indeed simultaneously Base Station 4 instructs Mobile Station 2 to look for at least two positioning signals occurring in two separate windows, and it informs the Mobile Station both when to look and exactly what synchronization character to look for in the positioning signal. Additionally, in step 640 Base Station 4 will page the positioning elements 3, 5 using the PICH so that they know to transmit a positioning signal at the next allotted time. Note that the Base Station 4 will have stored within a memory details of all of the positioning elements within its cell and therefore under its command, and what the predetermined times of transmission of the positioning elements are and what their associated synchronization character is. Thus, for example, in the event that a position request is received from MTSO 480 at the beginning of a new multi-frame, the next predetermined time for positioning element 3 to transmit a positioning signal might be at the time of reception by the positioning element 3 of the third frame in each multi-frame and its synchronization character might have index 110 out of the possible 256. Within the third frame (BTS relative timing) the PE will have a further predetermined narrow window within a given slot or within a plurality of slots. The window will typically be given as two offsets from the beginning of the slot, in numbers of chips, denoting the beginning of the window and the end of the window. The window will typically be such that it will not be overlap with the window within which the BTS normally transmits the symbols belonging to the synchronization channel. Such timing information will be designed in such a way that the PE's can be paged by the BTS in advance of the time at which the Mobile Station 2 has been instructed by the BTS 4 to search for symbols by the PE's. Thereafter, Base Station 4 proceeds to the following step 650 in which it awaits a response from the Mobile Station 2. If the Mobile Station is successful in detecting the positioning signals issued by both positioning element 3 and positioning element 5, the Mobile Station will transmit back to Base Station 4 with details of exactly when the positioning signals were received relative to the time of detection by said Mobile Station of a signal or part of a signal transmitted by said Base Station together with the associated synchronization characters that were received in order to identify which positioning elements the positioning signals were received from. Once the response has been received, the Base Station determines in the following step whether the response contains sufficient information to enable the position of the Mobile Station 2 to be calculated. If there is insufficient information (for example, if Mobile Station 2 was unsuccessful in detecting the positioning signal issued by positioning elements 5 within the designated window) the instruction flow is passed onto step 650 of reconfiguring the positioning element or elements. In this step, any positioning elements whose signals were not successfully detected by the Mobile Station are reconfigured by the Base Station. In one embodiment, this is performed as follows:

the Base Station 4 re-pages those positioning elements 5 whose positioning signals were not successfully detected by the Mobile Station 2. A prearranged convention determines that this re-paging of a positioning element within a predetermined time (fbr example, within 30 frames) instructs the positioning element that it must in some way reconfigure its transmission signal in order to give the Mobile Station 2 a better chance of detecting the positioning signal. In one embodiment, the reconfiguration simply comprises the positioning elements re-transmitting its positioning signal at the next allotted time with a power level increased by a predetermined amount which is stored within a memory of the positioning element 5.

Either before, after or at the same time as step 670, Base Station 4 also carries out step 680 of informing the Mobile Station 2 of a new window within which it should attempt to detect the synchronization character belonging to the unheard positioning element. From step 680, the instruction flow returns to step 650 which awaits a response from the Mobile Station 2 to see if this time around the positioning signal has been correctly detected. If it has still not been detected, the Base Station can continue to pass through the loop comprising steps 660, 670, 680 and 650 until the positioning signal has been correctly detected. Once a sufficient response has been received from the Mobile Station indicating that sufficient positioning signals have been detected to enable the position of Mobile Station 2 to be calculated, the instruction flow is passed onto step 690 of reporting the results onto a processor forming part of MTSO 480 where triangulation is performed on the basis of information about the position of Base Station 4 and positioning element 3 and 5 together with the information from which the respected distances from Mobile Station 2 to Base Station 4 and positioning elements 3 and 5 can be performed to calculate the position of Mobile Station 2. The positional information about Mobile Station 2 will then be passed on from MTSO 480 to whichever party initially requested the information.

Figure 7:
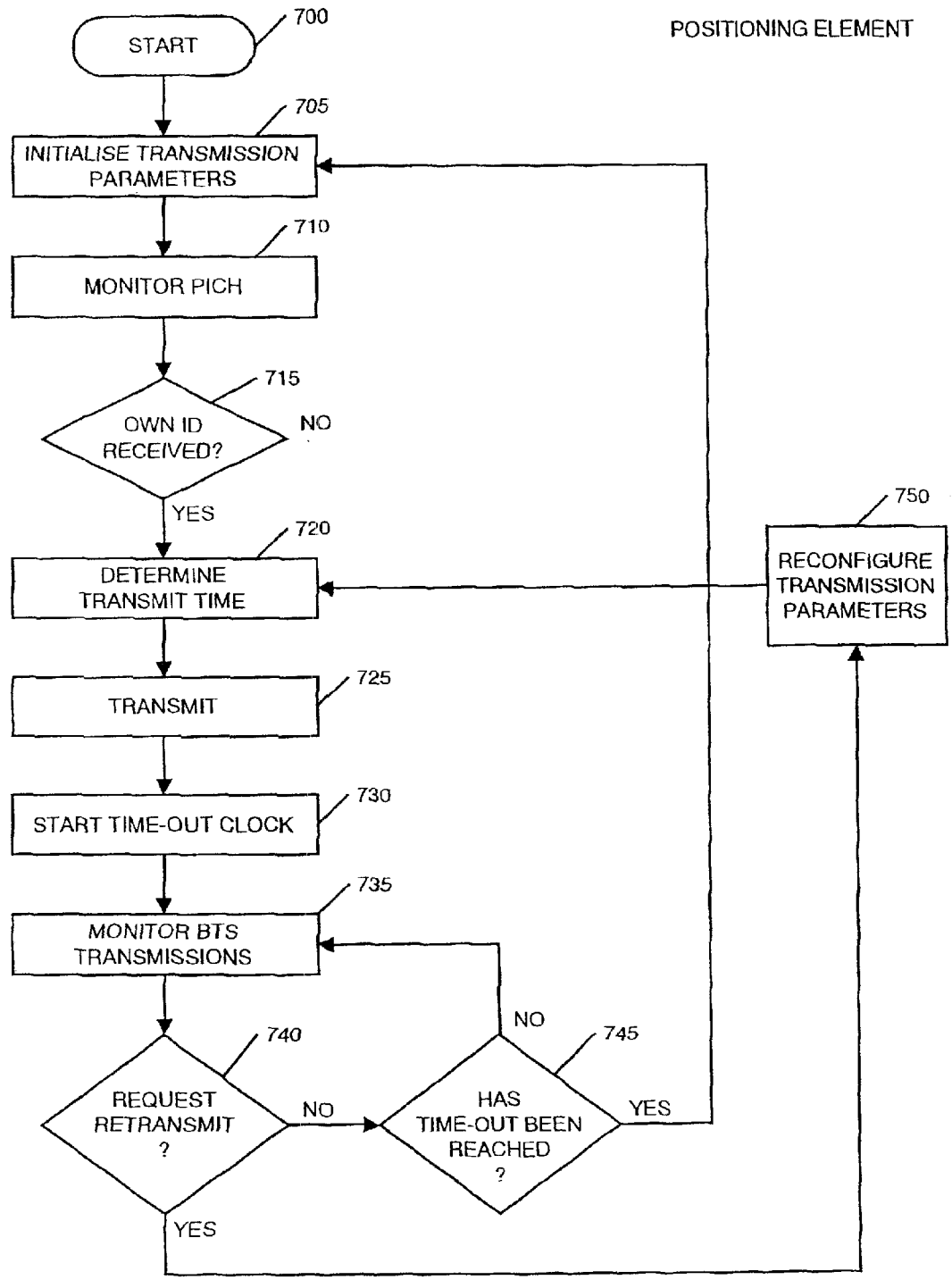
FIG. 7 is a flow chart setting out the steps to be performed by a positioning element in order to carry out a method in accordance with the present invention.

Referring now to FIG. 7, the steps to be performed by positioning element 5 are: start step 700, initialise transmission parameters step 705, monitor PICH step 710, determine if own I.D. has been received step 715, determine transmit time 720, transmit step 725, start time-out clock 730, monitor BTS transmission step 735, determine if request to retransmit has been received step 740, determine if time out has been reached step 745 and reconfigure transmission parameters step 750. When positioning element 3 is first switched ON, the first step at which it performs is step 705, in which it sets various transmission parameters to initial values. The sort of transmission parameters which it will set at this stage include the power of transmission of the signal and the times at which positioning signals will be sent. Note, that in order to enhance the chances of a Mobile Station 2 successfully receiving the positioning signal in a fading environment in which the Mobile Station 2 is travelling through various peaks and troughs of signal amplitude, the positioning element 3 may transmit each positioning signal a number of times in fairly rapid succession. By varying the times between transmissions, it may be possible to enhance the Mobile Station's chances of detecting the positioning signal depending on the environment and the way in which the Mobile Station is moving through the environment. Another transmission parameter could, for example, be the actual nature of the signal which is sent. In the following step 710, the positioning element monitors the PICH (note before the positioning element can do this, it will naturally need to synchronise itself with the Base Station and this can be done in exactly the same way as is done by the Mobile Station 2 described above The following step 715, determines whether or not the positioning element detects a flag on the PICH corresponding to its own paging group which typically would include all positioning elements in the cell. If no flag is detected the instruction flow returns back to the proceeding step 710 and continues to loop in this way until it receives notification on the PICH whereupon the instruction flow passes onto the following step 720 of determining at what time the positioning element should transmit its positioning signal. In order to determine at what time the positioning element should transmit its positioning signal, it follows a predefined algorithm which is stored in memory and which will involve consulting the initialised transmission parameters. For example, positioning element 3 might have three initially designated times within a multi-frame at which it is to transmit its positioning signal and it will choose the nearest such time available to it after receiving a paging indication from the BTS. Furthermore, as mentioned above, in order to cope with fading environments, the positioning element may retransmit its positioning signal one or more times after transmission of its positioning signal for the first time. Thus, positioning element 3 might have as its first available time for transmitting its positioning signal after receiving a paging indication at the beginning of a new multi-frame that it is to transmit its positioning signal for the first time at the beginning of the fifth slot of the third frame (i.e. at the time when the positioning element would receive the beginning of the fifth slot of the third frame of the transmission from the Base Station 4) and then again 5 slots later to assist reception by fast moving mobiles and again at the beginning of the fifth slot 10 frames later for slower moving Mobile Stations. Once the transmit times have been established in step 720, the instruction flow passes onto the flowing step 725 in which the positioning signal is transmitted. The instruction flow then proceeds onto the following step 730 in which a time out clock is started. The time out clock will form part of digital processing block 250 and simply counts slots or frames of the Base Station transmission. From step 730, the instruction flow passes onto step 735 in which the positioning element again monitors the PICH. Step 740 determines if a request for retransmission has been received which is detected in this embodiment by receiving a paging indication for the PE group within the PICH within a predetermined time. If no new paging indication is given to the PE group within the predetermined time interval which may be 30 frames, the PE's go back to monitoring the PICH in order to transmit their symbols after detecting an indication for their group. If this indication for their group though comes earlier than 30 frames after the last indication, this is perceived as a signal to communicate with the BTS for the reason of receiving a reconfiguration message. All PE's in a cell will then follow the exact same procedure as a MS that sees a flag on the PICH corresponding to its group. This involves reading the S-CCPCH (secondary common control channel) and reading the ID's conveyed in a certain frame. Of all the PE's in the cell that have gone on to read the SCCPCH typically only one will identify its ID and will proceed to contact the BTS via the air interface in order to receive a reconfiguration message., . In step 750, one or more of the transmission parameters are reconfigured to enable the Mobile Station which did not successfully receive the positioning signal first time round a better chance of receiving the positioning signal on the second time. The most straight forward reconfiguration simply involves increasing the power of the transmitted positioning signal by a predetermined percentage, for example increasing the power by ten per cent. Additionally, the transmit time may be changed to a new transmit time which is closer than say choosing again the fifth slot of the tenth frame. Note, that the positioning element is likely to have permanently stored a number of possible transmission times throughout a multi-frame and it will generally select automatically as part of step 720 the next available such transmission time. However, in step 750 the number of times that the positioning signal is re-transmitted and the time intervals between repeated transmissions may be varied to improve the chances of a quickly moving Mobile Station and receiving the positioning signal at least once in a fading environment. Once the transmission parameters have been reconfigured, the instruction flow is passed onto step 720 after which it loops around steps 725, 730, 735 back to the loop of steps 735, 740 and 745 until eventually it is established that the Mobile Station has successfully received the positioning signal at which point the instruction flow returns back to step 705 as described before.

Although a preferred embodiment of the present invention has been described above with reference to the figures, many alternative embodiments are envisaged which also fall within the scope of the appended claims. For example, in the preferred embodiment of the present invention, each cell 10 within network 1 includes two or more positioning elements 3, 5 whereby any Mobile Station within cell 10 can be positioned by detecting positioning signals from at least two of the positioning elements 3, 5 within its cell (since a third fixed point is distance from the Mobile Station 2 is known and will be formed by the Base Station 4). However, it is also intended that the positioning elements 3, 5 can be used to augment the forward link idle slot method as discussed in the introduction of this specification. In this embodiment, only a single positioning element might be placed within only those cells where the geography prevents easy detection by a Mobile Station of one or more signals from neighbouring Base Stations. In this case, the positioning element 3 will operate in much the same way as described above. However, Mobile Station 2 must include a sufficiently powerful automatic gain control unit to enable the much less powerful transmissions for more distance Base Stations to be detected during an idle slot in addition to the functionality described above. Furthermore, it is unlikely that Mobile Station 2 will be able to have advance knowledge of the synchronization symbol which a distant Base Station will be transmitting during the idle slot.

Similarly, although in the preferred embodiment the positioning element 3 transmits a synchronization character which is not used by any Base Station 4,6,7 within the network 1, it is possible that the positioning elements could use synchronization which are also used by the base stations. In this case, there could be confusion between the positioning elements and the Base Stations. Two possibilities of confusion arise. The first is that a Mobile Station attempting to synchronise with a Base Station for the purposes of soft handover could instead decode a signal from a positioning element and can become confused in this way. To overcome this problem, the Mobile Station 2 will need to determine that in the event that a synchronization character is detected in one slot but not again at the same time in the following slot or in the following slot, etc that the synchronization character has in fact been received from a positioning element and not a Base Station. The second possibility for confusion will involve a Mobile Station attempting to detect a positioning signal from a positioning element and confusing this with a similar synchronization character from a neighbouring Base Station. To avoid this possibility, some aspect of the positioning element signal will have to distinguish it from a similar signal from a neighbouring Base Station. The simplest way to achieve this would be to have the positioning element repeat its positioning signal one or more times with an interval between repeat transmissions which is not equal to one slot as is done by the Base Stations. For example, the positioning element could repeat its positioning signal after half a slot. Note that the ability of the Mobile Station to predict to a fairly high degree of accuracy the expected window of receipt of the positioning signal should make the possibility of confusion between a positioning signal and a synchronization signal from a Base Station fairly remote and the network could simply rely on the unlikeliness of such confusion to occur. However, it is preferred to provide some mechanism whereby the Mobile Station can distinguish between a positioning element signal and a Base Station signal.

Although, the positioning element 3 has been described in the preferred embodiment as having components for transmitting in the uplink, these are not strictly necessary and could be dispensed with since a protocol could be used which does not require any feedback from the positioning element 3 to Base Station 4. However, it is preferred to include such transmission circuitry to enable the positioning element to report back to the Base Station periodically to inform the Base Station of its status (for example, it can periodically report back as to the battery level so that its battery may be replaced or recharged before running flat).

In the typical embodiment of this positioning system operating in the context of UMTS, some MS's will be communicating with more than one BTS's at the same time (soft handover situation). As the PE's typically operate with timing relevant to the timing of the Base Station in the cell to which they have been placed, any measurements made by the MS must be associated with the timing of the BTS that alerted the PE's under its control to transmit positioning signals. A procedure may exist whereby the BTS with which the MS established communication first is the one that activates the PE's under its control.

In the event that the PE's transmit all the time, for example to enable regular positioning measurements by all MS's in the cell, the MS will be given information about the unique positioning signals transmitted by PE's in its serving and adjacent cells so that it can associate measurements with the timing of the relevant BTS when it is in soft handover.

What is claimed is:

1. A method of positioning a mobile station in a cellular network including a controlling base station and a plurality of positioning elements each of which is capable of generating a positioning signal and transmitting said positioning signal without requiring receipt of an instruction signal from said controlling base station, wherein said controlling base station controls communications within a cell in which said positioning elements are located, and wherein said controlling base station performs the steps of:

generating and transmitting a positioning instruction signal to said mobile station, said positioning instruction signal identifying an expected time of arrival of said positioning signals by said mobile station;

generating a paging signal and paging said plurality of positioning elements within the cell thereby causing said plurality of positioning elements to generate and transmit said positioning signals, each said positioning signal comprising information identifying the positioning element which transmitted said positioning signal; and receiving a report from said mobile station in an uplink communication on the results of detection of said positioning signals by said mobile station.

2. A method of positioning a mobile station as in claim 1 in which, when the reported results of detection indicate that said mobile station did not receive said positioning signal transmitted by a given positioning element, the given positioning element is instructed by said base station to retransmit said positioning signal at a higher power level within a predetermined time.

3. A method of positioning a mobile station as in claim 2, wherein the positioning element retransmits its positioning signal at the next allotted time with a power level increased by a predetermined amount.

4. A positioning element for use in positioning mobile stations communicating with a controlling base station of a cellular network via an air interface and in which said positioning element is capable of transmitting a positioning signal without requiring receipt of an instruction signal from said controlling base station, said positioning element;

synchronizes with downlink transmissions of said controlling base station, and transmits positioning signals with predetermined delays in relation to receipt of certain instances of signals transmitted from said controlling base station, said positioning signals comprising information identifying said positioning element.

5. A positioning element in accordance with claim 4, wherein said positioning element does not transmit any information to said controlling base station.

6. A positioning element for use in positioning mobile stations communicating with a controlling base station of a cellular network via an air interface and in which said positioning element;

synchronizes with downlink transmissions of said controlling base station, and transmits positioning signals periodically at predetermined times relative to the time of detection by said positioning elements of a signal or part of a signal transmitted by said base station, and without instruction by said base station, said positioning signals comprising information identifying said positioning element.

7. A positioning element as in claim 4 or 6 for use in a CDMA cellular network and in which the positioning signals comprise spreading codes uniquely associated with each positioning element.

8. A positioning element in accordance with claim 6, wherein said positioning element does not transmit any information to said controlling base station.

9. A mobile station for communicating with a cellular network comprising a controlling base station and a plurality of positioning elements each of which is capable of generating a positioning signal, and transmitting said positioning signal without requiring receipt of an instruction signal from said controlling base station, and in which said mobile station synchronizes with downlink transmissions from said controlling base station and detects positioning signals transmitted from said positioning elements synchronized to said downlink transmissions, wherein the timing window for the expected time of arrival of said positioning signals to be detected is transmitted to said mobile station from said controlling base station in advance of receipt of said positioning signals at said mobile station, each positioning signal comprising information identifying said positioning element which transmitted said positioning signal.

10. A mobile station as in claim 9 operating with CDMA cellular network in which the results of detection of positioning signals are reported to the controlling base station in uplink communication between said mobile station and the base station.

* * * * *